(12) United States Patent
Robertson

(10) Patent No.: US 11,167,713 B2
(45) Date of Patent: Nov. 9, 2021

(54) ROLL-OVER PROTECTION APPARATUS

(71) Applicant: David Robertson, Clifton (AU)

(72) Inventor: David Robertson, Clifton (AU)

( * ) Notice: Subject to any disclaimer, the term of this patent is extended or adjusted under 35 U.S.C. 154(b) by 323 days.

(21) Appl. No.: 16/392,485

(22) Filed: Apr. 23, 2019

(65) Prior Publication Data

US 2019/0322235 A1    Oct. 24, 2019

(51) Int. Cl.
*B60R 21/13* (2006.01)
*B60R 21/00* (2006.01)

(52) U.S. Cl.
CPC ...... *B60R 21/13* (2013.01); *B60R 2021/0018* (2013.01); *B60Y 2200/124* (2013.01)

(58) Field of Classification Search
CPC .... F16C 1/101; F16C 29/123; F16C 11/0661; F16C 1/04; F16C 11/06; F16C 2326/01; H01Q 1/084; F16L 3/202; F16L 3/015; F16D 3/14; F16D 3/64; B60R 21/13; B60R 2021/0018; B60R 21/131; B60R 2021/0074; B60R 2021/0076; B60R 21/11; B60R 2021/132; B60Y 2200/124; B62K 5/01

See application file for complete search history.

(56) References Cited

U.S. PATENT DOCUMENTS

| | | | | |
|---|---|---|---|---|
| 2,199,004 A * | 4/1940 | Lord | .................. | B60N 2/01516 403/203 |
| 2,214,685 A * | 9/1940 | Stone, Jr. | ............... | H01Q 1/084 343/882 |
| 2,460,648 A * | 2/1949 | Millar | ..................... | F16D 3/265 464/110 |
| 2,470,210 A * | 5/1949 | Booth | ................. | F16C 11/0661 403/36 |
| 3,188,111 A * | 6/1965 | Ells | ..................... | B66F 9/07545 280/748 |
| 3,397,911 A * | 8/1968 | Brosius, Sr. | ........... | B60N 2/888 297/216.12 |
| 3,560,019 A * | 2/1971 | Moore | ............... | B62D 33/0604 280/756 |
| 3,584,897 A * | 6/1971 | Frantz | ................. | B66F 9/07545 280/756 |
| 3,624,662 A * | 11/1971 | Feder | ..................... | H01Q 1/084 343/715 |
| 3,626,421 A * | 12/1971 | Santana | ................. | H01Q 1/084 343/900 |
| 3,689,100 A * | 9/1972 | Schmid | .................... | B62D 7/16 280/93.511 |
| 3,754,315 A * | 8/1973 | Heitman | ............... | B60R 21/131 29/401.1 |

(Continued)

*Primary Examiner* — Paul N Dickson
*Assistant Examiner* — Timothy Wilhelm
(74) *Attorney, Agent, or Firm* — Womble Bond Dickinson (US) LLP

(57) ABSTRACT

The present invention is designed to be fitted in the upper part of Roll Bars on small vehicles such as quad bikes, ATV's, ride-on mowers, and small tractors ("small vehicles") to overcome the issue with striking overhanging objects. If the Roll Bar system including the present invention is struck when the vehicle is in forward motion, the present invention allows the upper portion of the Roll Bar to flex, either allowing it to pass under the object or providing a more gradual reduction in speed as opposed to an instant jolt, then returning to the original upright position.

16 Claims, 8 Drawing Sheets

(56) References Cited

U.S. PATENT DOCUMENTS

| | | | | |
|---|---|---|---|---|
| 3,762,761 A * | 10/1973 | Erickson | B66F 9/07545 | 296/107.03 |
| 3,802,720 A * | 4/1974 | Ellis | B60R 21/131 | 280/755 |
| 4,047,750 A * | 9/1977 | Samide | B66F 9/07545 | 296/107.03 |
| 4,061,393 A * | 12/1977 | Blomstrom | B60R 21/11 | 296/190.06 |
| 4,077,655 A * | 3/1978 | Skahill | B60R 21/131 | 280/756 |
| 4,158,460 A * | 6/1979 | White | B60R 21/131 | 280/756 |
| 4,408,672 A * | 10/1983 | Albright | B60R 21/131 | 180/89.14 |
| 4,413,451 A * | 11/1983 | Featherstone | B60Q 1/2657 | 277/553 |
| 4,877,265 A * | 10/1989 | DeBraal | B60R 21/131 | 280/756 |
| 4,949,991 A * | 8/1990 | Ludwig | B60R 21/131 | 280/756 |
| 5,042,835 A * | 8/1991 | Burns | B60R 21/131 | 280/756 |
| 5,110,185 A * | 5/1992 | Schmutz | B60R 21/13 | 297/410 |
| 5,129,676 A * | 7/1992 | Sheehan | B60R 21/131 | 280/756 |
| 5,186,423 A * | 2/1993 | Wakayama | B60Q 1/50 | 248/160 |
| 5,286,091 A * | 2/1994 | Busch | B60R 21/02 | 297/464 |
| 5,312,199 A * | 5/1994 | Smith, Jr. | F16C 11/00 | 403/119 |
| 5,503,430 A * | 4/1996 | Miki | F16C 11/10 | 280/756 |
| 5,718,454 A * | 2/1998 | Harrod | B60R 21/13 | 280/756 |
| 5,779,272 A * | 7/1998 | Panek | B60R 21/131 | 280/756 |
| 5,839,758 A * | 11/1998 | Finch | B60R 21/131 | 280/756 |
| 6,105,890 A * | 8/2000 | Rayner | B02C 17/14 | 241/179 |
| 6,171,141 B1 * | 1/2001 | Yasui | F16C 1/262 | 439/545 |
| 6,368,222 B1 * | 4/2002 | Masayuki | F16C 11/06 | 403/52 |
| 6,409,413 B1 * | 6/2002 | Bieg | F16C 11/0619 | 403/114 |
| 6,688,689 B1 * | 2/2004 | Thorn | A47C 7/14 | 297/314 |
| 6,857,682 B2 * | 2/2005 | Eggers | B60J 7/085 | 296/98 |
| 6,875,114 B2 * | 4/2005 | Barron | F16D 3/64 | 464/179 |
| 7,241,069 B2 * | 7/2007 | Richter | F16C 11/0661 | 248/288.31 |
| 7,261,321 B2 * | 8/2007 | Della Valle | B60R 21/131 | 280/756 |
| 7,311,330 B2 * | 12/2007 | Kachouh | B60R 21/13 | 280/756 |
| 7,341,278 B2 * | 3/2008 | Queveau | B60R 21/13 | 280/756 |
| 7,396,047 B1 * | 7/2008 | Young | B60R 21/13 | 280/756 |
| 7,438,319 B2 * | 10/2008 | Cooper | B60R 21/131 | 280/756 |
| 7,467,813 B2 * | 12/2008 | Gunderson | F16L 37/0987 | 285/319 |
| 7,568,732 B2 * | 8/2009 | Schlup, Jr. | B60R 21/131 | 16/232 |
| 7,654,569 B2 * | 2/2010 | Nelson | B60R 21/13 | 280/756 |
| 7,661,709 B2 * | 2/2010 | Becker | B60R 21/13 | 280/756 |
| 7,784,380 B2 * | 8/2010 | Berger | B21B 35/141 | 74/825 |
| 7,891,380 B2 * | 2/2011 | Gunderson | F16L 37/0987 | 138/96 R |
| 7,950,696 B2 * | 5/2011 | Robertson | B60R 21/13 | 280/756 |
| 7,971,905 B2 * | 7/2011 | McCord | B60R 21/131 | 280/756 |
| 8,087,694 B2 * | 1/2012 | Johnson | B62K 5/01 | 280/756 |
| 8,151,464 B2 * | 4/2012 | Orend | F16C 11/0647 | 29/898 |
| 8,336,815 B2 * | 12/2012 | Rauber | F16C 1/04 | 244/60 |
| 8,424,911 B2 * | 4/2013 | Alexander, IV | B60R 21/131 | 280/756 |
| 8,430,426 B2 * | 4/2013 | Rasset | B62D 33/0604 | 280/756 |
| 8,480,054 B2 * | 7/2013 | Pintauro | F02B 39/00 | 251/77 |
| 8,523,225 B2 * | 9/2013 | Reinke | B60R 21/13 | 280/756 |
| 8,678,695 B2 * | 3/2014 | Baldus | F16B 9/056 | 403/223 |
| 8,905,434 B1 * | 12/2014 | Bartel | B60R 21/131 | 280/756 |
| 9,051,951 B2 * | 6/2015 | Zhu | F16B 39/24 | |
| 9,216,709 B2 * | 12/2015 | Perez De Larraya Sagues | B60R 21/131 | |
| 9,266,490 B2 * | 2/2016 | Johnson | B60R 22/20 | |
| 9,308,791 B2 * | 4/2016 | Korson | B60D 1/62 | |
| 9,387,790 B2 * | 7/2016 | Seales | B60P 1/5428 | |
| 9,404,527 B2 * | 8/2016 | Marchard | E21B 4/02 | |
| 9,486,846 B2 * | 11/2016 | Donadon | B21B 35/14 | |
| 9,511,735 B2 * | 12/2016 | Schlup, Jr. | B60R 21/131 | |
| 9,573,547 B2 * | 2/2017 | Friedeman | B60R 21/02 | |
| 9,573,548 B2 * | 2/2017 | Bartel | B60R 22/48 | |
| 9,616,720 B2 * | 4/2017 | Drake | B60D 1/06 | |
| 9,616,837 B1 * | 4/2017 | Bartel | B60R 21/131 | |
| 9,764,680 B2 * | 9/2017 | Tamay | B60Q 1/2661 | |
| 9,791,767 B2 * | 10/2017 | Ye | B64D 47/08 | |
| 9,849,854 B2 * | 12/2017 | Kanai | B60R 21/131 | |
| 9,908,549 B2 * | 3/2018 | Newell | B62B 5/0076 | |
| 10,138,944 B2 * | 11/2018 | Brown | F01L 1/352 | |
| 10,156,255 B2 * | 12/2018 | Keen | F16L 3/015 | |
| 10,322,683 B2 * | 6/2019 | Lawrence | B60R 11/06 | |
| 10,328,883 B2 * | 6/2019 | Stuber | B60R 21/131 | |
| 10,377,333 B2 * | 8/2019 | Bartel | B60R 21/131 | |
| 10,399,403 B2 * | 9/2019 | Chambers | B60G 15/067 | |
| 10,408,254 B2 * | 9/2019 | Singleton | F16C 1/101 | |
| 10,493,939 B2 * | 12/2019 | Bartel | A01D 75/20 | |
| 10,583,885 B2 * | 3/2020 | Raffaelli | B62D 9/02 | |
| 10,597,092 B2 * | 3/2020 | Stover | A01D 34/82 | |
| 10,618,391 B2 * | 4/2020 | Cook | A01D 67/02 | |
| 10,648,501 B2 * | 5/2020 | Iyer | F16C 1/06 | |
| 10,696,260 B2 * | 6/2020 | Mayefske | B60R 21/131 | |
| 10,793,181 B2 * | 10/2020 | Bennett | B60G 3/20 | |
| 10,799,676 B2 * | 10/2020 | Khuu | F16H 37/122 | |
| 2006/0175501 A1 * | 8/2006 | Richter | F16C 11/0661 | 248/288.31 |
| 2006/0267384 A1 * | 11/2006 | Fischer | B60N 2/888 | 297/216.12 |
| 2007/0252361 A1 * | 11/2007 | Houston | B60D 1/54 | 280/515 |
| 2013/0223919 A1 * | 8/2013 | Brecht | F16C 11/10 | 403/31 |
| 2016/0052560 A1 * | 2/2016 | Peterson | B62J 23/00 | 280/154 |
| 2017/0074316 A1 * | 3/2017 | Kim | A61F 5/0125 | |
| 2018/0163774 A1 * | 6/2018 | Kronenbitter | F16B 9/052 | |
| 2019/0105955 A1 * | 4/2019 | Crane | B60D 1/01 | |
| 2020/0101920 A1 * | 4/2020 | Bartel | A01D 34/828 | |
| 2020/0148264 A1 * | 5/2020 | Daikoku | B62D 7/20 | |

* cited by examiner

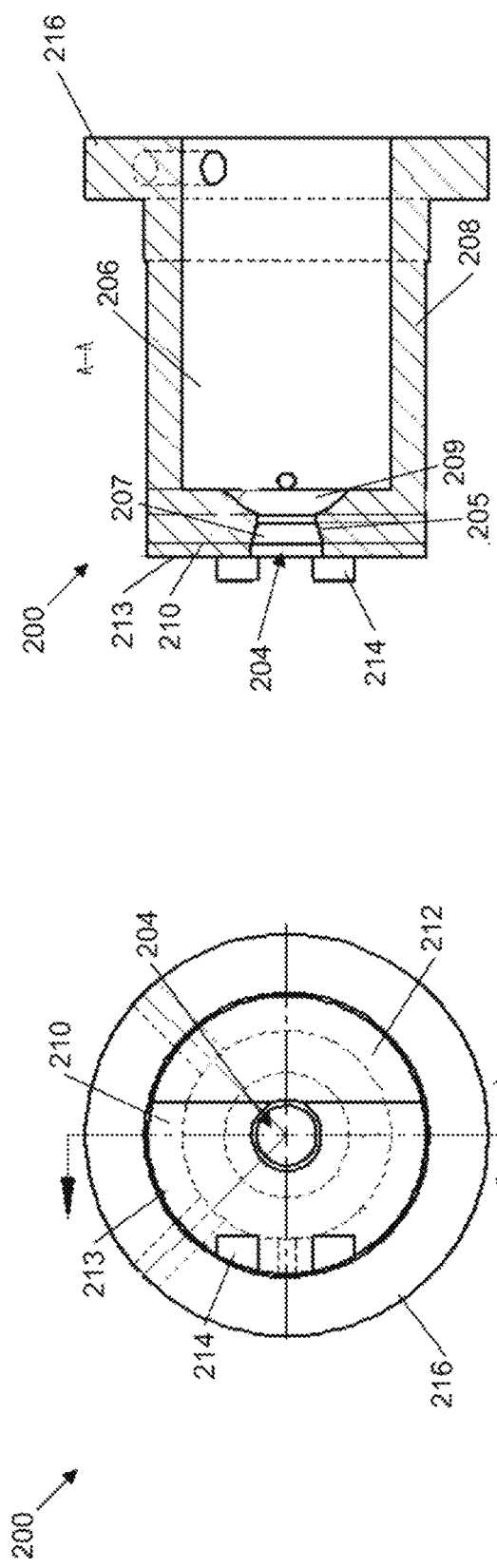
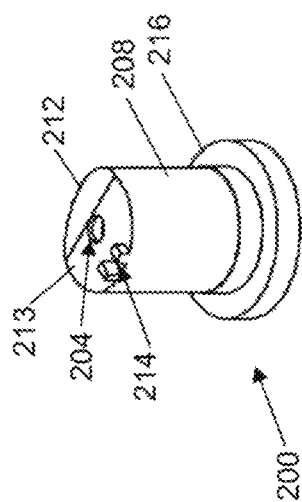
FIG. 7
FIG. 8
FIG. 9

ROLL-OVER PROTECTION APPARATUS

RELATED APPLICATIONS

This application claims priority to Australian Provisional Patent Application No. 2018901353 filed Apr. 24, 2018, the entire contents of which are hereby incorporated by reference herein.

TECHNICAL FIELD

The present invention relates to a roll-over protection apparatus or Crush Protection Devices (CPD) also known as "Roll Bars" for a vehicle. In particular, the invention concerns a roll-over protection system/apparatus that prevents the vehicle from rolling or flipping upside down or aids in protecting the operator from injury if the vehicle continues to roll.

BACKGROUND ART

Roll Over Protection Systems (ROPS) and Crush Protection Devices (CPD) also known as "Roll Bars" have been fitted to vehicles in particular tractors and turf care equipment for many years and their performance in protecting the vehicle's operator is well documented. However since their inception there have been concerns with the 'roll bar' coming in contact with overhead obstacles for example tree branches.

Operators can forget to check that the vehicle can pass under an obstacle safely or misjudge the required clearance with the result of the 'roll bar' coming in contact with the overhead obstacle. The result to the vehicle of this contact is varied but can often result in a sudden stop or violent manoeuvre of the vehicle that causes injury to the operator.

Innovations that allow the 'roll bar' to 'fold down' so the vehicle can pass under the obstacle are common on many brands of roll bar; examples of such a 'fold down' system shown for example in the patent EP1580082A1.

There have been cases of vehicles rolling over and the operator being killed when the 'roll bar' has been folded down and not returned to its upright position.

There are 'roll bars' that have some level of flexibility. However, the flexibility is in relation to operator contact with the 'roll bar'. Some examples of flexible roll over protection systems are shown U.S. Pat. No. 9,573,547B2 and U.S. Pat. No. 5,890,738A.

Systems that have multiple flex points do not retain the rigidity of the traditional roll bar in rear roll-overs. They may also lower the clearance for the operator. One possible option might be the use of shear pins. Shear pins, however, do not return to upright after initial impact and are ineffective for subsequent rolls or impacts.

It will be clearly understood that, if a prior art publication is referred to herein, this reference does not constitute an admission that the publication forms part of the common general knowledge in the art in Australia or in any other country.

SUMMARY OF INVENTION

The present invention is directed to a roll-over protection apparatus for a vehicle, which may at least partially overcome at least one of the abovementioned disadvantages or provide the consumer with a useful or commercial choice.

With the foregoing in view, the present invention in one form, resides broadly in a roll-over protection apparatus for a vehicle, the protection apparatus including:
a first body and a second body;
a joining member for joining the first body relative to the second body; and wherein the first body is operable to deflect from a first position to a second position upon application of a load to the first body in at least one direction and return to the first position upon removal of the load.

Advantageously, the first body is allowed to deflect or move out of the way when struck inadvertently by overhead objects but only to an extent after which movement of the first body is then limited such that the first body performs as a traditional roll bar before then returning to its original position.

In some embodiments, the first body may be prevented from deflecting from the first position upon application of a load to the first body in at least a second direction.

In some embodiments, the first body and the second body are substantially similar in size and shape. In some embodiments, the first body and the second body are identical.

In some embodiments, the first body may include a first end including a first mounting portion for being pivotally mounted relative to the second body and a second end. The second end may be a free end. In alternative embodiments, the first body portion may include a first end including a first mounting portion for being pivotally mounted relative to the second body and a second end including a second mounting portion for mounting an elongate member. The elongate member may include an end for mounting to the second mounting portion of the first body and a free end. Typically, the elongate member will be a rigid member. The elongate member may be any particular size or shape. It is envisioned, however, that the length of the elongate member will be suitable for providing protection to an operator of the vehicle in the event that the vehicle rolls over. The elongate member may be in the form of an elongate rod. The elongate rod may be a roll bar member.

In some embodiments, the second body may include a first mounting portion for being pivotally mounted relative to the first body and a second mounting portion for mounting the second body relative to a portion of a vehicle or a for mounting another elongate member. Similar to the elongate member described above, the other elongate member may be rigid. The other elongate member may be any particular size or shape. It is envisioned, however, that the length of the other elongate member aid in providing protection to an operator of the vehicle in the event that the vehicle rolls over. The other elongate member may be in the form of another elongate rod. The other elongate rod may be another roll bar member.

In some embodiments, the first body, the second body or both the first and the second body may each include at least one sleeve portion and at least one wall for capping one end of the sleeve portion. Each sleeve portion may define a bore for receiving a portion of the elongate member or the other elongate member. A skilled person would understand that the cross sectional size and shape of each bore will correspond, or substantially correspond, to the cross sectional size and shape of the elongate member or other elongate member.

Each at least one wall, for capping the end of each sleeve portion, may include an aperture for receiving a portion of a joining assembly. The aperture may be defined by at least one side wall. The at least one side wall of the aperture may include a first portion and a second portion. The first portion may be a diverging portion. The diverging portion may be stepped or smooth. The diverging portion may diverge toward an outer surface of the first body. The second portion of the at least one side wall may be partially-spheric, curved or domed for receiving and locating at least a portion of a dome washer. In some embodiments, the second portion of the at least one side wall may be torispherical.

Typically, when the first body is mounted relative to the second body, the aperture of the first body and the aperture of the second body will align or at least substantially align such that the joining member may extend through the aperture in the first body portion and through the aperture in the second body portion. Typically, the size of each aperture will at least be larger than the cross sectional size of the joining member.

In some embodiments, the first body may include an abutment surface and the second body may include a corresponding abutment surface. Usually, the abutment surfaces will face one another. Usually, the abutment surfaces will be spaced apart from one another when the body is in the first position. In other words, the abutment surface of the first body may be spaced apart from the corresponding abutment surface of the second body when the first body is in the first position. Typically, when the first body is in the at least one second position, at least a portion of the abutments surfaces will be in contact with one another. In other words, the abutment surface of the first body portion may contact the corresponding abutment surface of the second body when the first body is in the at least one second position.

In some embodiments, the abutment surface of the first body may include at least one angled abutment surface portion and the corresponding abutment surface of the second body includes at least one corresponding angled abutment surface portion. Typically, the angled abutment portions allows for limited movement of the first body relative to the second body upon application of the load to the first body in the at least one direction. In other words, the angled abutment surface portion and the corresponding angled abutment surface portion upon contact limited deflection of the first body in the at least one direction. The angled abutment surface portion and the corresponding, angled abutment surface portion may be each in the form of a flat bevelled or chamfered surface. Alternatively, the angled abutment surface portion and the corresponding angled abutment surface portion may be each in the form of a rounded edge. In some embodiments, the abutment surface and corresponding abutment surface may be smooth or substantially smooth. In alternatively embodiments, the abutment surface and corresponding abutment surface may be textured.

In some embodiments, the apparatus may further include a stop arrangement for preventing movement of the first member relative to the second member. Advantageously, deflection or movement of the first member relative to the second member may be limited depending and varying on the direction the load is applied thereto.

In some embodiments, the stop arrangement may extend from an abutment surface of the first body and abuts an abutment surface of the second body.

In some embodiments, the second body comprises a receiving portion. Preferably, the receiving portion is complementarily shaped to receive the stop and limit deflection of movement of the first member relative to the second member. In some embodiments, the receiving portion comprises one or more wall members abutting or adjacent one or more edge surfaces of the stop.

In some embodiments, the stop arrangement may include a first stop portion and a corresponding second stop portion. The first body may include the first stop portion. The first stop portion may extend from a main body portion of the body. The first stop portion may form at least part of the abutment surface of the first body. The second body may include the corresponding second stop portion. The corresponding second stop portion may extend from a main body portion of the second body. The second stop portion may form at least part of the corresponding abutment surface of the second body.

In some embodiments, the first stop portion may include a pair of ridges. The pair of ridges may be spaced apart. The pair of ridges may extend parallel to one another. Typically, the ridges extend in a direction towards the second body. In some embodiments, one of the pair of ridges extends further toward the second body than the other.

Further, the second stop portion may include a pair of corresponding ridges. The pair of corresponding ridges may be spaced apart. The corresponding ridges may extend parallel to one another. Typically, the corresponding ridges extend in a direction toward the first body. In some embodiments, one of the pair of corresponding ridges extends further toward the first body than the other.

Typically, the ridges may be offset relative to one another such that one of the pair of ridges of the first body extends into a channel defined by the corresponding ridges of the second body and one of the pair of ridges of the second body extends into a channel defined by the pair of ridges of the first body such that movement of the first body in at least a third direction substantially prevents movement of the first body relative to the second body.

The second body may include a lower locating portion for locating a resilient member. The lower locating portion may be in the form of a seat. The lower locating portion may extend from an outer side surface of the main body portion of the second body. Typically, the lower locating portion may be in the form of a flange. In some embodiments, the first body may include an upper locating portion for locating the resilient member. Similar to the lower locating portion, the upper locating portion may extend from an outer surface of the main body portion of the first body. Typically, the locating portion may be in the form of a flange. Advantageously, the upper locating portion and the lower locating portion locate the spring such that the spring biases the first body away from the second body.

The apparatus may further include the resilient member. The resilient member may sit on the seat of the second body and movement of the resilient member may be limited by the upper locating portion. Advantageously, the resilient member biases the first body spaced apart from the second body. Typically, the resilient member surrounds at least a portion of the first body and the second body. Typically, the resilient member may surround at least the mounting end of the first body and the first mounting end of the second body. In some embodiments, the resilient member is a spring. Typically, the resilient member will have a stiffness value suitable for returning the first body to a substantially vertical position when no load is acting on the first body and/or after a load is removed from acting on the first body.

As mentioned above the apparatus includes a joining member for joining the first body to the second body. The joining member may include an elongate body. In some embodiments the joining member may be a pin, screw, a bolt or the alike. The joining member may form part of a joining assembly.

The apparatus may include the joining assembly. In some embodiments, the joining assembly may further include at least one dome washer. The joining assembly may also include a nut and at least one flat washer. In some embodiments, the joining assembly includes a nut, at least a pair of flat washers and a pair of dome washers. In preferred embodiments, a first washer of the pair of flat washers and a first dome washer of the pair of dome washers is mounted to the joining member, the joining member is then inserted through the aperture in the second body and the aperture in the first body, a second dome washer of the pair of dome washers and a second flat washer of the pair of flat washers is then mounted to the joining member after which the nut may be mounted to the joining member in order to secure the first body relative to the second body.

In some embodiments the joining assembly may include a universal joint or a ball joint.

According to another embodiment of the present invention there is provided a protection apparatus for a vehicle, the protection apparatus including:
- a first body mounted relative to a second body;
- the second body for attaching to the vehicle; and
- a joining assembly for mounting and joining the second body relative to the first body; the joining assembly configured to allow limited deflection of the first elongate body relative to the second body in a first direction, substantially no deflection of the first elongate body relative to the second body in a second direction and a degree of deflection of the first elongate body relative to the second body in at least a third direction, the degree of deflection in the third direction being less than the limited amount of deflection in the first direction.

A skilled person would understand that the first body, the second body and the joining assembly may be the same or similar to the first body, the second body and the joining assembly described above in relation to the first aspect of the present invention.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 7 shows a top view of a first or second body in accordance with a preferred embodiment of the present invention.

FIG. 8 shows a section view of a first or second body in accordance with a preferred embodiment of the present invention.

FIG. 9 shows an isometric view of a first or second body in accordance with a preferred embodiment of the present invention.

DESCRIPTION OF EMBODIMENTS

Figure 1A:
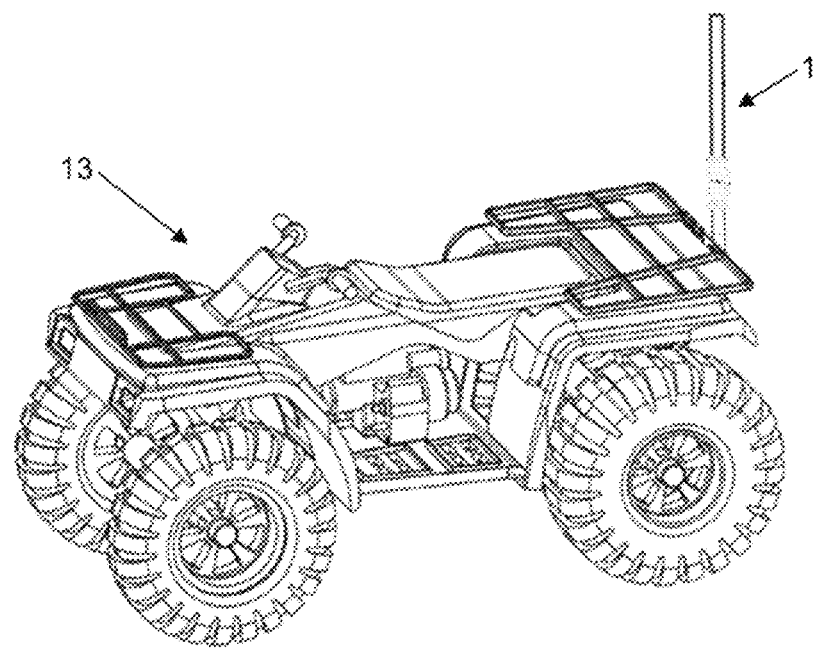
FIG. 1a shows an apparatus, in accordance with a preferred embodiment of the present invention, attached to a vehicle.

FIG. 1a shows a preferred embodiment of the present invention, in the form of roll-over protection apparatus 1, when attached to vehicle 13. In the embodiment shown vehicle 13 is in the form of a quadbike. However, a skilled person would understand that vehicle 13 may be any vehicle, for example, a ride on mower, turf equipment, a quad bike or the alike.

Figure 1B:
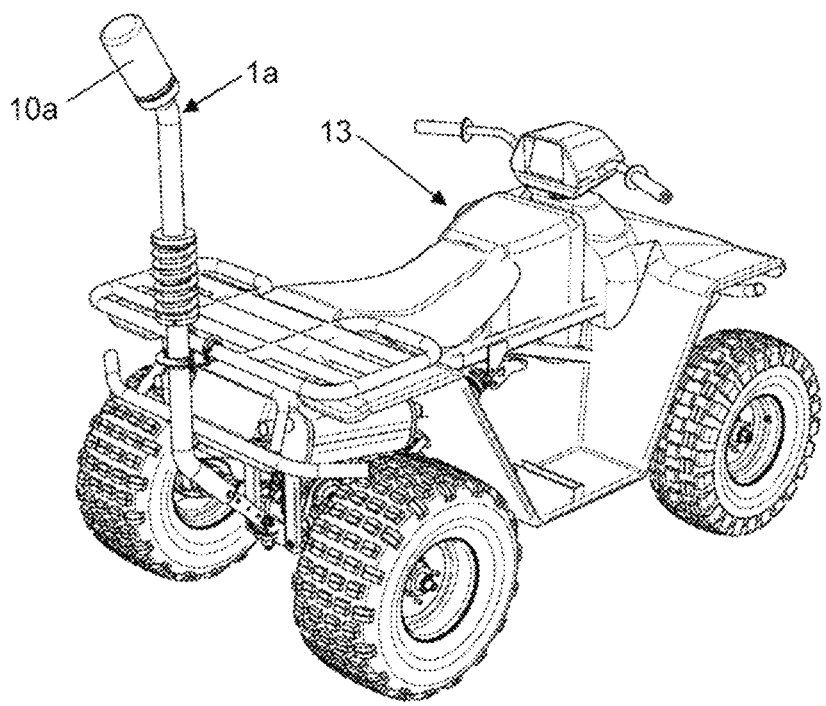
FIGS. 1b, 1c and 1d show rollover apparatus similar to the apparatus shown FIG. 1 in various flexed positions.
Figure 1C:
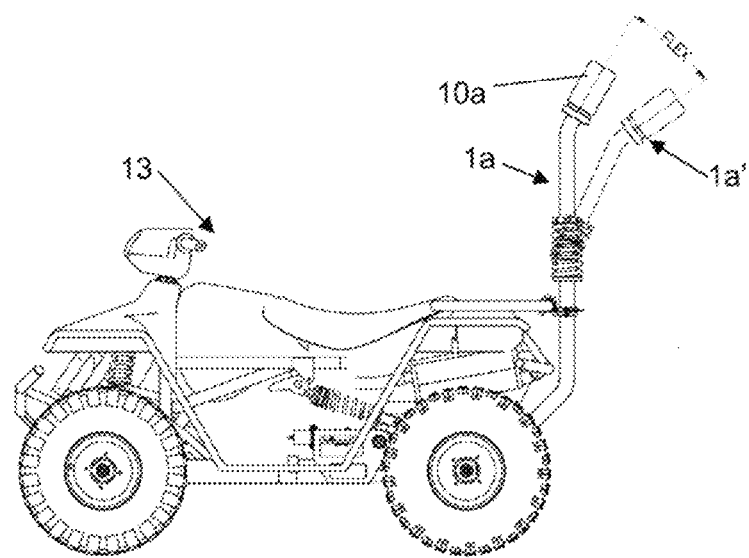
Figure 1D:
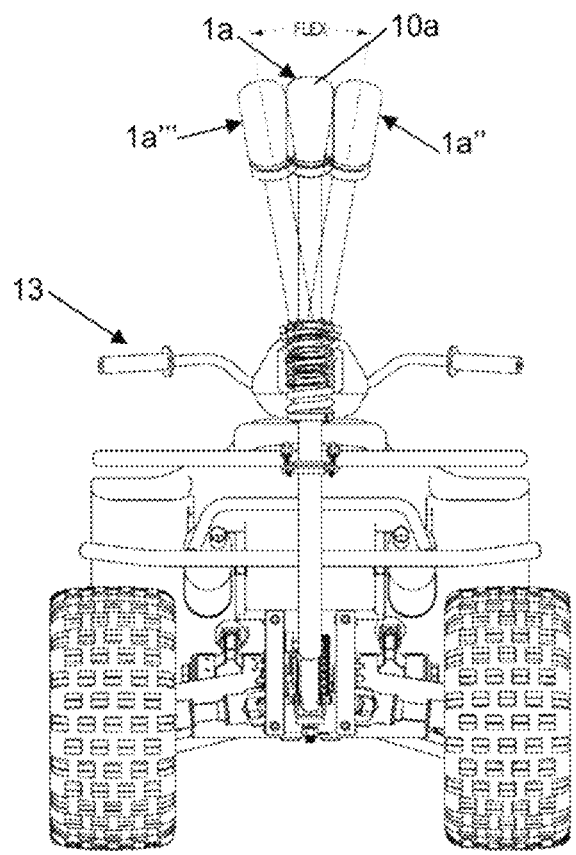

FIGS. 1b-1d show another preferred embodiment of the present invention in the form of roll-over protection apparatus 1a which is substantially similar to roll-over protection apparatus 1, which will be described in more detail below. Apparatus 1a is attached to vehicle 13 and includes a plastic cap 10a at an end of the apparatus 1a not attached to the vehicle 13. FIGS. 1c and 1d respectively show the ability of the apparatus 1a to flex (to a degree) backwards away (as indicated by the broken line illustration 1a') from the vehicle 13 (FIG. 1c) and the ability of the apparatus 1a to flex (to a degree) side to side (FIG. 1d) as shown in the broken line illustrations 1a" and 1a'" of the apparatus 1a.

Deflection of the apparatus 1a in a rearward or backwards direction away from the rear of the vehicle 13 (see illustration 1a' in FIG. 1b) is useful when the vehicle 13 is being used in dense bushland having many low hanging branches. More particularly, in such a situation, the apparatus 1a can limitedly deflect when it impacts a branch so that the apparatus 1a can pass under the branch without jolting or preventing the vehicle 13 from continuing forward and potentially throwing a rider from the vehicle 13. The limited deflection allowed from side-to-side (as shown in FIG. 1d) also assists in preventing jolting when impacting a stationary object (such as a branch) that is not perfectly tangential to the vehicle 13.

Figure 2:
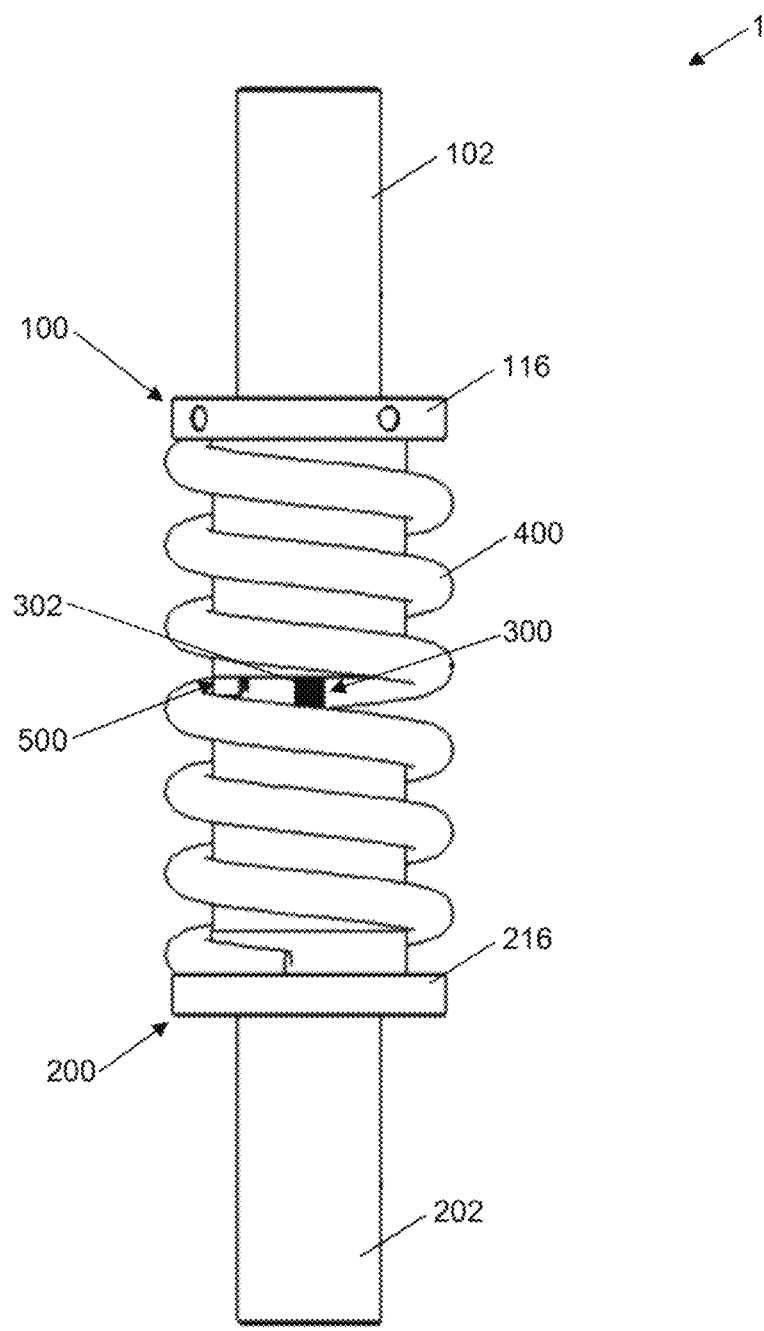
FIG. 2 shows the apparatus as shown in FIG. 1 in accordance with a preferred embodiment of the present invention.

As best shown in FIG. 2, apparatus 1 includes a first body 100 and a second body 200, a joining member (in the form of bolt 302) which forms part of joining assembly 300 for joining the first body 100 relative to the second body 200 and a resilient member (in the form of spring 400) for spacing the first body 100 relative to the second body 200. Joining assembly 300 of apparatus 1 further includes a stop arrangement 500. In use, stop arrangement 500 of joining assembly 300 limits or prohibits deflection of the first body 100 relative to the second body 200, which will we explained in more detail below.

Each of the first body 100 and the second body 200, respectively, have an elongate member, in the form of upper elongate member 102 and lower elongate member 202, mounted therein and extending from the respective first body 100 and second body 200 away from the bolt 302 in opposite directions.

Figures 3A, 3B:
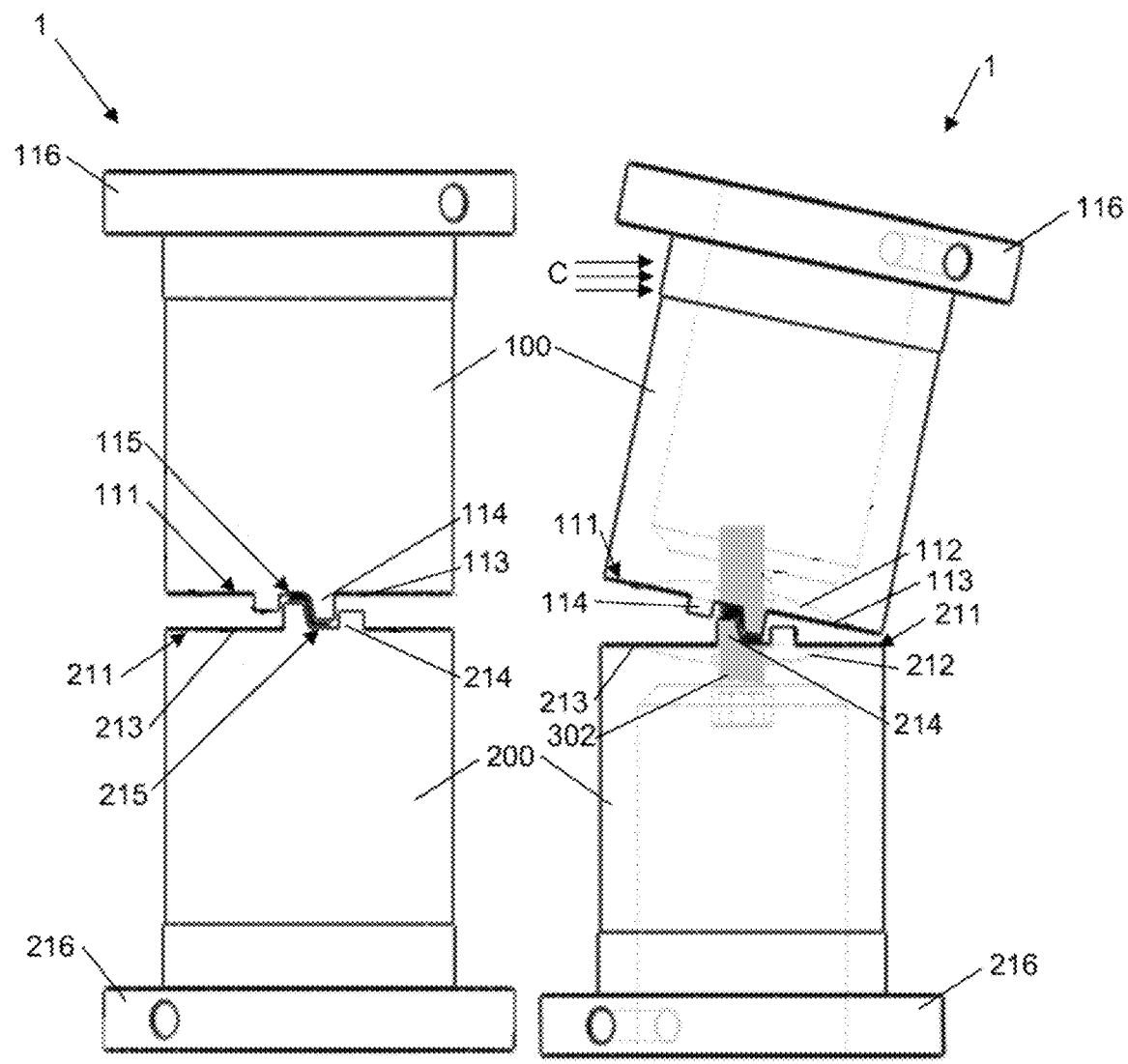
FIGS. 3a and 3b show a front view of the apparatus as shown in FIG. 2 without a spring in first, upright, position (FIG. 3a) and in a flexed, position demonstrating limited deflections in one direction (FIG. 3b).
Figure 4A:
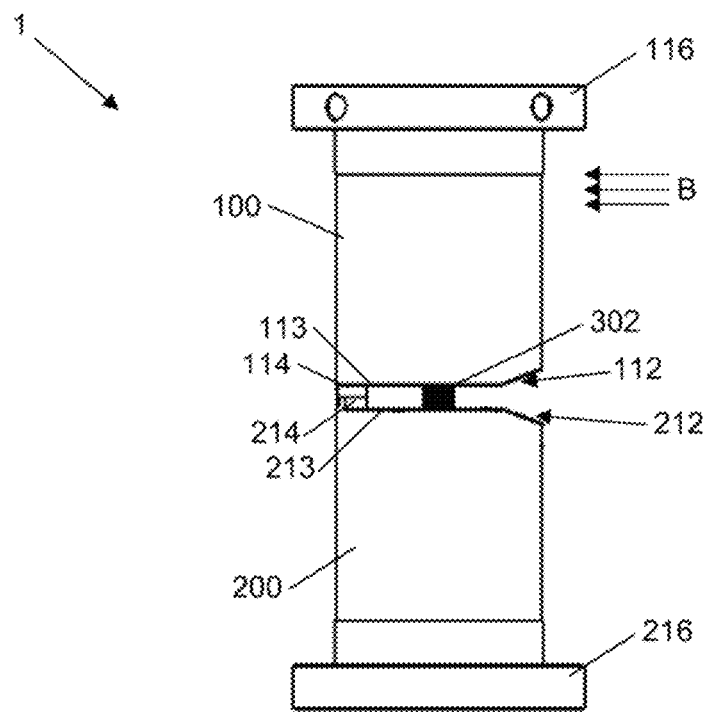
FIGS. 4a and 4b show a side view of the apparatus as shown in FIG. 3 (i.e. without a spring) in the first, upright, position (FIG. 4a) and in a second, flexed position demonstrating impact of two bevelled surfaces of the apparatus (FIG. 4b).
Figure 4B:
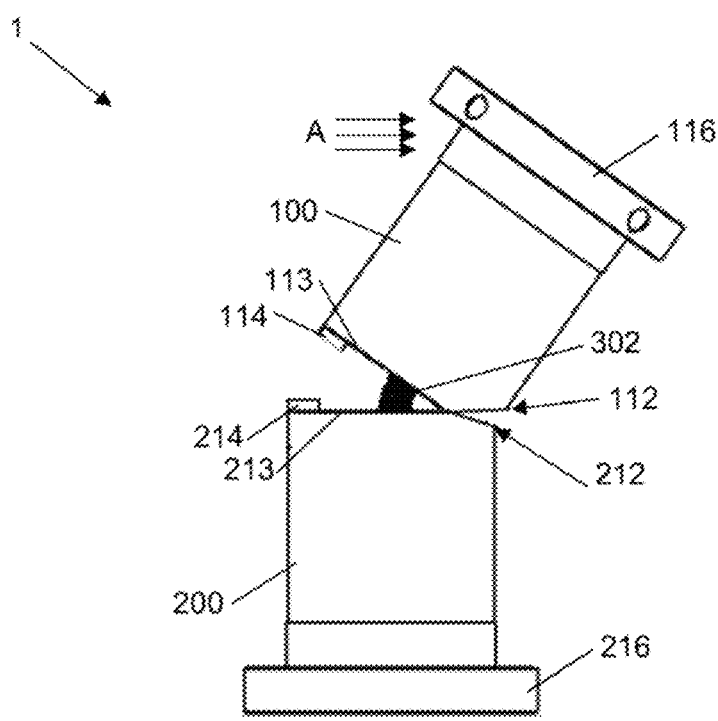
Figure 6:
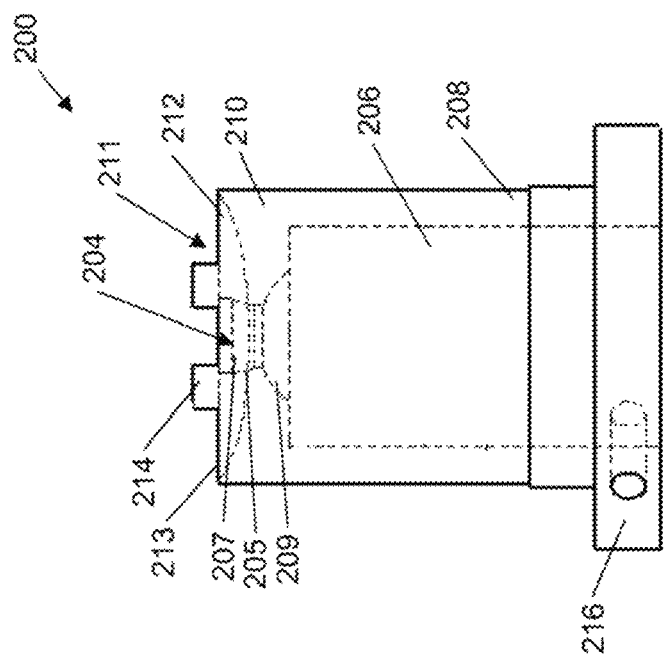
FIG. 6 shows a front view of a first or second body in accordance with a preferred embodiment of the present invention.
Figure 5:
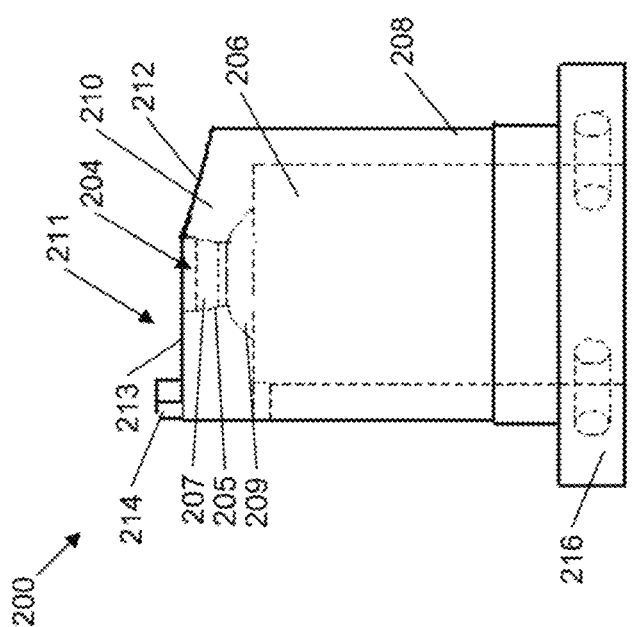
FIG. 5 shows a side view of a first or second body in accordance with a preferred embodiment of the present invention.

The first body 100 is operable to limitedly deflect from a first position (as illustrated in FIG. 4*a*) to a second position (as illustrated in FIG. 4*b*) upon application of a load to the first body 100 in at least one direction (e.g. direction A as shown in Figure b) and return to the first position (shown in FIG. 3*a*) upon removal of the load. Advantageously, the first body 100 is allowed to deflect or move out of the way (without fully collapsing or significantly reducing clearance for an operator) when struck inadvertently by overhead objects (not shown) but only to an extent after which movement of the first body 100 is then limited such that the first body 100 still performs as a traditional roll bar.

The first body 100 is also configured to prevent deflection from the first position upon application of a load to the first body 100 in at least a second direction (e.g., direction B as shown in FIG. 4*a*). Advantageously, apparatus 1 allows little or no longitudinal movement in loads from the rear causing the roll bar system to act as a traditional roll bar in a backward roll-over.

The first body 100 is also configured to allow a degree of deflection being loss than the limited amount of deflection in the first direction in at least a third direction (e.g. a direction tangential to directions A and B, shown as direction C in FIG. 3*b*). As mentioned above, this is advantageous in allowing the vehicle 13 and apparatus 1 to pass under obstructions (such as low branches and the like) without jolting the rider of the vehicle 13 to a sudden stop. With deflection of the apparatus 1 only allowed in one direction e.g. backwards away from the rear of the vehicle 13), if the apparatus 1 impacted an obstruction at an angle not tangential to the direction of travel, the vehicle 13 and rider would still be subject to jolting and potential injury.

Turning to FIGS. 5 to 9, the second body 200 is shown in more detail. It can be seen that second body 200 includes a first mounting portion, in the form of aperture 204, for receiving the bolt 300 and pivotally mounting the second body 200 relative to a first body 100 and a second mounting portion, in the form of bore 206 for receiving the lower portion 202 therein.

The second body 200 further includes a sleeve portion 208 and a wall 210 which extends tangentially from sleeve portion 208 for capping one end of the sleeve portion 208. As evidenced in the figures, the sleeve portion 208 defines the bore 206. A skilled person would understand that the cross-sectional size and shape of bore 204 substantially corresponds to the cross-sectional size and shape of the lower elongate member 202.

Figure 10:
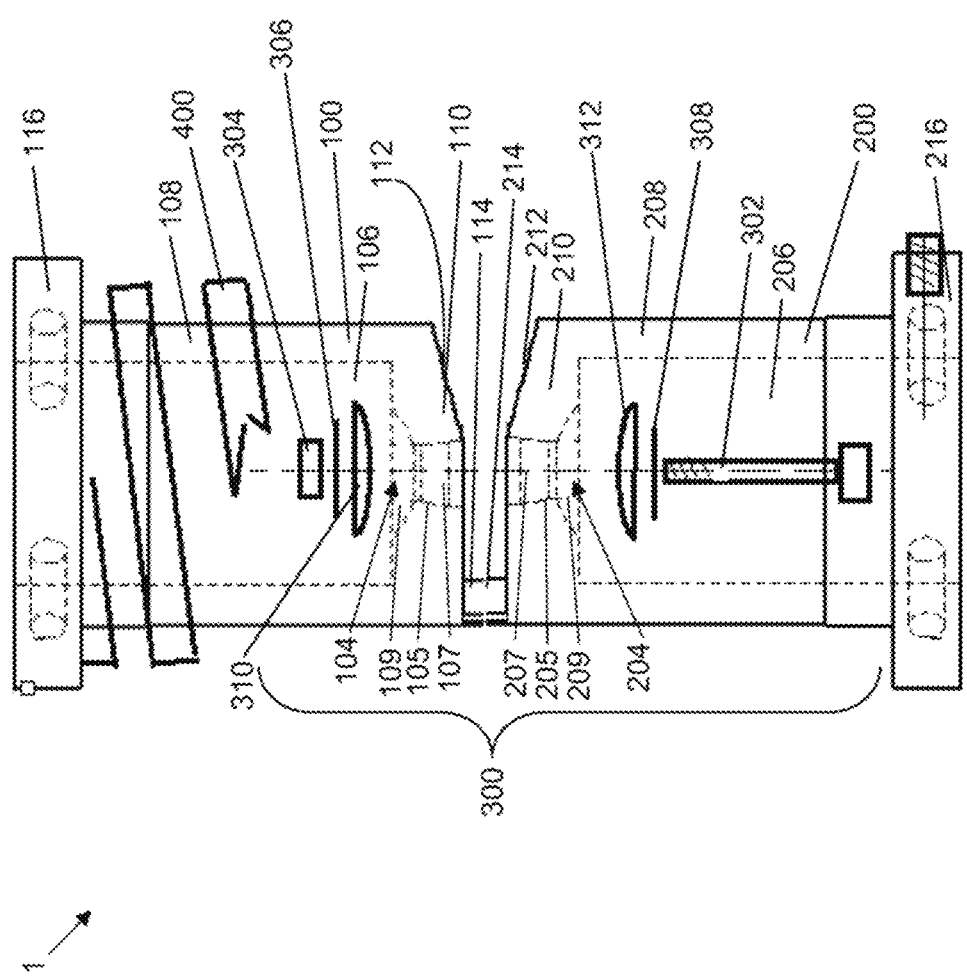
FIG. 10 shows a section view of the apparatus, including an exploded joining assembly, in accordance with a preferred embodiment of the present invention

Wall 210 defines aperture 204 having a side wall 205 which receives a portion of joining assembly 300 (e.g. bolt 302). Side wall 205 includes a first diverging portion 207 and a second partially-spheric portion 209. As can best be seen in FIG. 3*b*, the first diverging portion 207 receives bolt 302 of joining assembly 300. Turning to FIG. 10, it can be seen that the second partially-spheric portion 209 receives and locates at least a portion of a dome washer 312 of joining assembly 300.

Second body 200 includes an abutment surface 211. The abutment surface 211 includes two portions: a flat (or horizontal) abutment portion 213 and an angled abutment portion, in the form of bevelled portion 212, which extends at an angle from the relatively flat abutment portion 213. Abutment surface 211 of the second body 200 faces abutment surface 111 of the first body 100, which can be seen in FIG. 10, where the respective bevelled portions 112, 212 extend from the respective flat abutment portions 113, 213 and diverge from each other. The bevelled portions 112 and 212 are spaced apart from one another when the apparatus 1 is in the first position which is not subject to a load or force. When first body 100 is in a second position as a result of application of a load, a portion of the bevelled portions 112, 212 will contact one another as illustrated in FIG. 4*b*.

Second body 200 further includes a pair of ridges or lugs 214 that form part of a stop portion of stop arrangement 500 for preventing movement of the first body 100 relative to the second body 200. Advantageously, deflection or movement of the first body 100 relative to the body 200 may be limited depending and varying on the direction the load is applied thereto.

With reference to FIGS. 6-9, it is apparent that ridges 214 may be spaced apart and extend parallel to one another to facilitate interlocking of reciprocal ridges 114 located on the first body 100. The pair of ridges 214 forms a channel 215.

Turning to FIG. 3, the illustration shows that the ridges or lugs 214 of the second body 200 are offset relative to the lugs 114 of the first body 100 when the first body 100 is mounted relative to the second body 200. Advantageously, when ridges 114 of the first body 100 are interlocked and engaged with ridges 214 of the second body 200, rotation of the first body 100 relative to second body 200 is substantially prevented. In the preferred embodiment shown in FIG. 3, ridges 114, 214 are slightly bevelled to allow minimal sideways and lateral movement without rotation.

In some embodiments, one of the stop portions located on one of the first body or the second body may comprise a single ridge and the corresponding stop portion located on the opposing body comprises two spaced apart ridges that form a channel therebetween. The channel then receives the single ridge to limit or prevent deflection of the first body and the second body relative to each other.

Referring back to FIGS. 2, 5 and 6, second body 200 is shown to further include a lower locating portion, in the form of a lower flange 216, for locating the resilient member, in the form of spring 400. As best shown in FIG. 2, the lower flange 216 with upper flange 116 locate and retain spring 400 therebetween such that the spring 400 biases the first body 100 away from the second body 200.

It should be noted that first body 100 includes the same features as the second body 200 described above. In particular, first body 100 includes upper elongate member 102, aperture 104, bore 106, sleeve portion 108, wall 110, abutment surface 111, bevelled portion 112, flat portion 113, a pair of ridges 114, a channel 115 formed between the pair of ridges 114 and upper flange 116, some of which have been referenced and described above specifically. When mounted relative to one another using joining assembly 300, first body 100 is orientated upside down and above second body 200.

Turning now to FIG. 10, apparatus 1 illustrates joining mechanism 300, for joining and mounting first body 100 relative to second body 200, in more detail. Joining mechanism 300 includes a joining member, which is referenced above as bolt 302. Joining assembly 302 further includes a nut 304, a pair of flat washers 306, 308 and a pair of dome washers 310, 312.

In assembly, the first washer 308 of the pair of washers and the first dome washer 312 are mounted to bolt 302. Bolt 302 is then inserted through the aperture 204 in wall 210 in the second body 200 and the aperture 104 in wall 110 in the first body 100. The second dome washer 310 and the second flat washer 306 are then mounted to the bolt 302 after which nut 304 may be mounted to the end of bolt 302 in order to secure first body 100 relative to second body 200. The respective pairs of ridges 114, 214 located on first body 100 and second body 200 also aid in locating first body 100 relative to second body 200.

In the preferred embodiment shown, joining mechanism 300 is adjustable to limit the spacing 5 between first body 100 and second body 200 and thereby control the degree of movement of first body 100 relative to second body 200.

Referring to FIG. 2, spring 400 keeps the surfaces 4 separated and to return the upper part of the roll bar to vertical when not under impact. Spring 10 also provides increasing tension as the flex increases depending on the load impact and biases upper portion 11 in an upright position when not impacted.

When in use, if the upper elongate member 102 is struck when the vehicle 13 is in forward motion, apparatus 1 allows the upper elongate member 102 (and the first body 100) to deflect, either allowing it to pass under the object or providing a more gradual reduction in speed as opposed to an instant jolt, then returning to the original upright position. Advantageously, in the event that the upper elongate member 102 receives a load from any direction, upper elongate member 102 immediately returns after contact to the upright position so that it continues to provide the required protection in the event of a roll.

In the preferred embodiment shown, apparatus 1 meets the relevant ROPS/CPD standards such as the strength/energy requirements of ISO 5700.

In the present specification and claims if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

What is claimed is:

1. A roll-over protection apparatus for attachment to a vehicle, the protection apparatus comprising:
a first body mounted relative to a second body;
the second body for attaching to the vehicle; and
a joining assembly joining the second body relative to the first body;
the joining assembly configured to allow limited deflection of the first body relative to the second body in a first direction, substantially no deflection of the first body relative to the second body in a second direction and a degree of deflection of the first body relative to the second body in at least a third direction, the degree of deflection in the third direction being less than the limited amount of deflection in the first direction.

2. A roll-over protection apparatus according to claim 1, wherein the joining assembly comprises:
a joining member joining the first body relative to the second body; and
a stop arrangement configured to allow limited deflection of the first body relative to the second body in a first direction, substantially no deflection of the first body relative to the second body in a second direction and a degree of deflection of the first body relative to the second body in at least a third direction, the degree of deflection in the third direction being less than the limited amount of deflection in the first direction.

3. A roll-over protection apparatus according to claim 2, wherein the stop arrangement comprises:
a first stop portion extending from the first body;
a second stop portion extending from the second body, wherein the first stop portion is received within the second stop portion.

4. A roll-over protection apparatus according to claim 3, wherein the first stop portion is laterally offset from the second stop portion.

5. A roll-over protection apparatus according to claim 3, wherein the second stop portion comprises a receiving portion, and wherein the receiving portion is complementarily shaped to receive the first stop portion.

6. A roll-over protection apparatus according to claim 5, wherein the receiving portion comprises one or more wall members abutting one or more corresponding edge surfaces of the first stop portion.

7. A roll-over protection apparatus according to claim 3, wherein the first stop portion comprises a pair of parallel spaced apart ridges receiving the second stop portion in a channel between the pair of parallel spaced apart ridges of the first stop portion.

8. A roll-over protection apparatus according to claim 7, wherein a length of the second stop portion is greater than a length of either of the pair of parallel spaced apart ridges of the first stop portion.

9. A roll-over protection apparatus according to claim 7, wherein a first ridge of the pair of spaced apart ridges of the first body extends further from the first body than the second ridge of the pair of spaced apart ridges of the first stop portion.

10. A roll-over protection apparatus according to claim 9, wherein the second stop portion comprises a pair of parallel spaced apart ridges, wherein one of the pair of ridges of the second stop portion is received in a channel between the pair of ridges of the first stop portion and one of the pair of ridges of the first stop portion is received in a channel between the pair of ridges of the second stop portion.

11. A roll over protection apparatus according to claim 10, wherein a first ridge of the pair of spaced apart ridges of the second body extends further from the second body than the second ridge of the pair of spaced apart ridges of the second body.

12. A roll-over protection apparatus according to claim 1, wherein each of the first body and the second body comprises an abutment surface, wherein the abutment surface of the first body faces the abutment surface of the second body in a spaced apart configuration, wherein in use movement of the first body relative to the second body is limited by impact of a portion of the abutment surface of the first body against a portion of the abutment surface of the second body.

13. A roll-over protection apparatus according to claim 12, wherein the abutment surface of the first body includes an angled abutment surface portion and the abutment surface of the second body includes an angled abutment surface portion opposed to the angled abutment surface portion of the first body.

14. A roll-over protection apparatus according to claim 1, wherein the first body comprises an upper locating portion and the second body comprises a lower locating portion, and a resilient member surrounding at least a portion of each of the first body and the second body, wherein the resilient member is located between the upper locating portion and the lower locating portion and biases the first body away from the second body.

15. A roll-over protection apparatus according to claim 1, wherein the first body comprises:
   an elongate member; and
   a sleeve portion defining a bore receiving the elongate member therein, wherein an end of the bore is capped by a wall having an aperture formed therein, wherein a first portion of the joining assembly is received therethrough; and the second body comprises:

an elongate member; and a sleeve portion defining a bore receiving the elongate member therein, wherein an end of the bore is capped by a wall having an aperture formed therein, wherein a second portion of the joining assembly is received therethrough.

16. A roll-over protection apparatus according to claim 1, wherein the joining assembly comprises a joining member for joining the first body relative to the second body; and a stop arrangement configured to allow the first body to deflect from a first position to a second position upon application of a load to the first body in at least one direction and return to the first position upon removal of the load.

* * * * *